(12) United States Patent
Howard et al.

(10) Patent No.: US 10,099,854 B2
(45) Date of Patent: Oct. 16, 2018

(54) TRASHCAN SYSTEM AND RELATED METHODS OF USE

(71) Applicant: POUBELLE LLC, Birmingham, AL (US)

(72) Inventors: James A. Howard, Birmingham, AL (US); Lori D. Montag, Broken Arrow, OK (US)

(73) Assignee: POUBELLE LLC, Birmingham, AL (US)

( * ) Notice: Subject to any disclaimer, the term of this patent is extended or adjusted under 35 U.S.C. 154(b) by 0 days.

(21) Appl. No.: 15/510,641

(22) PCT Filed: Sep. 10, 2015

(86) PCT No.: PCT/US2015/049384
§ 371 (c)(1),
(2) Date: Mar. 10, 2017

(87) PCT Pub. No.: WO2016/040601
PCT Pub. Date: Mar. 17, 2016

(65) Prior Publication Data
US 2017/0210559 A1     Jul. 27, 2017

Related U.S. Application Data

(60) Provisional application No. 62/048,993, filed on Sep. 11, 2014.

(51) Int. Cl.
*A47L 7/00*     (2006.01)
*B65F 1/10*     (2006.01)
(Continued)

(52) U.S. Cl.
CPC .......... *B65F 1/105* (2013.01); *A47L 7/0047* (2013.01); *B65F 1/062* (2013.01); *B65F 1/1638* (2013.01);
(Continued)

(58) Field of Classification Search
CPC .......... A47L 7/0047; A47L 7/00; B65F 1/105; B65F 1/062; B65F 1/1638; G06Q 30/0635; G06Q 10/087
See application file for complete search history.

(56) References Cited

U.S. PATENT DOCUMENTS 5,205,013 A * 4/1993 Lopes ................. A47L 5/38
                                                        15/301
5,946,768 A * 9/1999 Kelly ................. A47L 5/28
                                                        15/310
(Continued)

FOREIGN PATENT DOCUMENTS

WO     2004082450 A1     9/2004

OTHER PUBLICATIONS

International Search Report for PCT/US15/49384 Completed Nov. 10, 2015; dated Jan. 19, 2016 2 Pages.
(Continued)

*Primary Examiner* — David Redding
(74) *Attorney, Agent, or Firm* — The Roy Gross Law Firm, LLC; Roy Gross

(57) ABSTRACT

A trashcan system is disclosed herein. In various aspects, the trashcan system includes an inlet located about a trashcan to be proximate to a surface upon which the trashcan is placed in order to entrain materials disposed upon the surface into air communicated into the inlet. The trashcan system, in various aspects, includes a collector disposed within the trashcan. A chamber of the collector may receive air with materials entrained therein communicated from the inlet, and the chamber may be adapted to collect materials entrained in the air. An exit may be located about the trashcan that communicates with the chamber to exhaust the air from the chamber, in various aspects. A vacuum assembly located about the trashcan, the vacuum assembly coop- (Continued)

erates with the inlet, the chamber, and the exit to communicate the air into the inlet, through the chamber, to the exit where the air is exhausted.

16 Claims, 4 Drawing Sheets

(51) Int. Cl.
    *B65F 1/06*     (2006.01)
    *B65F 1/16*     (2006.01)
    *G06Q 10/08*     (2012.01)
    *G06Q 30/06*     (2012.01)

(52) U.S. Cl.
    CPC ....... *G06Q 10/087* (2013.01); *G06Q 30/0635* (2013.01); *B65F 2210/168* (2013.01)

(56) References Cited

U.S. PATENT DOCUMENTS

| | | | |
|---|---|---|---|
| 5,953,788 A * | 9/1999 | Douglas | A47L 5/38 15/310 |
| 6,199,714 B1 * | 3/2001 | Thompson | B65F 1/06 220/495.04 |
| 6,671,924 B1 | 1/2004 | Rood | |
| 6,928,691 B2 | 8/2005 | Freeman | |
| 7,096,532 B2 | 8/2006 | Rood | |
| 7,356,872 B2 | 4/2008 | Jones et al. | |
| 7,578,024 B2 | 8/2009 | Hughes | |
| 7,656,109 B2 * | 2/2010 | Yang | B65F 1/1638 220/211 |
| 9,352,887 B2 * | 5/2016 | Poss | B65F 1/0033 |
| 9,751,692 B2 * | 9/2017 | Yang | B65F 1/1638 |
| 9,856,080 B2 * | 1/2018 | Yang | B65F 1/1638 |
| 2004/0177467 A1 | 9/2004 | Jones et al. | |
| 2006/0196874 A1 | 9/2006 | Yang | |
| 2008/0189898 A1 | 8/2008 | Hughes | |

OTHER PUBLICATIONS

Written Opinion for PCT/US15/49384 Completed Nov. 10, 2015; dated Jan. 19, 2016 4 Pages.

Martin, "The emergence of the connected city, Using technology to prevent rat outbreak", Retrieved on Jan. 8, 2014, url <http://radar.oreilly.com/2014/01/the-emergence-of-the-connected-city.html>.

* cited by examiner

TRASHCAN SYSTEM AND RELATED METHODS OF USE

RELATED APPLICATIONS

This application is a National Phase of PCT Patent Application No. PCT/US2015/049384 having International filing date of Sep. 10, 2015, which claims the benefit of priority of U.S. Patent Application No. 62/048,993 filed on Sep. 11, 2014. The contents of the above applications are all incorporated by reference as if fully set forth herein in their entirety.

TECHNICAL FIELD

The present disclosure relates to systems for trash disposal, and, more specifically, to automated trashcans.

BACKGROUND ART

Conventional trashcans generally require the use of a dustpan to manually collect materials and then place the materials into the can. This may require the user to bend or to simultaneously grapple with a broom, the dustpan, and the trashcan, which may be awkward and which may pose a challenge to a user who is physically impaired. In addition, various other operations of a conventional trashcan require manual operation, such as, for example, opening and closing of a lid that encloses the trashcan, monitoring the supply of trash bags available for use within the trashcan, or the purchase of additional trash bags.

Accordingly, there is a need for improved apparatus as well as related methods and compositions of matter that facilitate automatically the above operations as well as other operations described herein.

DISCLOSURE OF THE INVENTION

These and other needs and disadvantages may be overcome by the apparatus and the related methods and compositions of matter disclosed herein. Additional improvements and advantages may be recognized by those of ordinary skill in the art upon study of the present disclosure.

A trashcan system is disclosed herein. In various aspects, the trashcan system includes, an inlet located about a trashcan to be proximate to a surface upon which the trashcan is placed in order to entrain materials disposed upon the surface into air communicated into the inlet. The trashcan system, in various aspects, includes a collector disposed within the trashcan. A chamber of the collector may receive air with materials entrained therein communicated from the inlet, and the chamber may be adapted to collect materials entrained in the air. An exit may be located about the trashcan that communicates with the chamber to exhaust the air from the chamber, in various aspects. A vacuum assembly located about the trashcan, the vacuum assembly cooperates with the inlet, the chamber, and the exit to communicate the air into the inlet, through the chamber, to the exit where the air is exhausted, in various aspects.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

Figure 1:
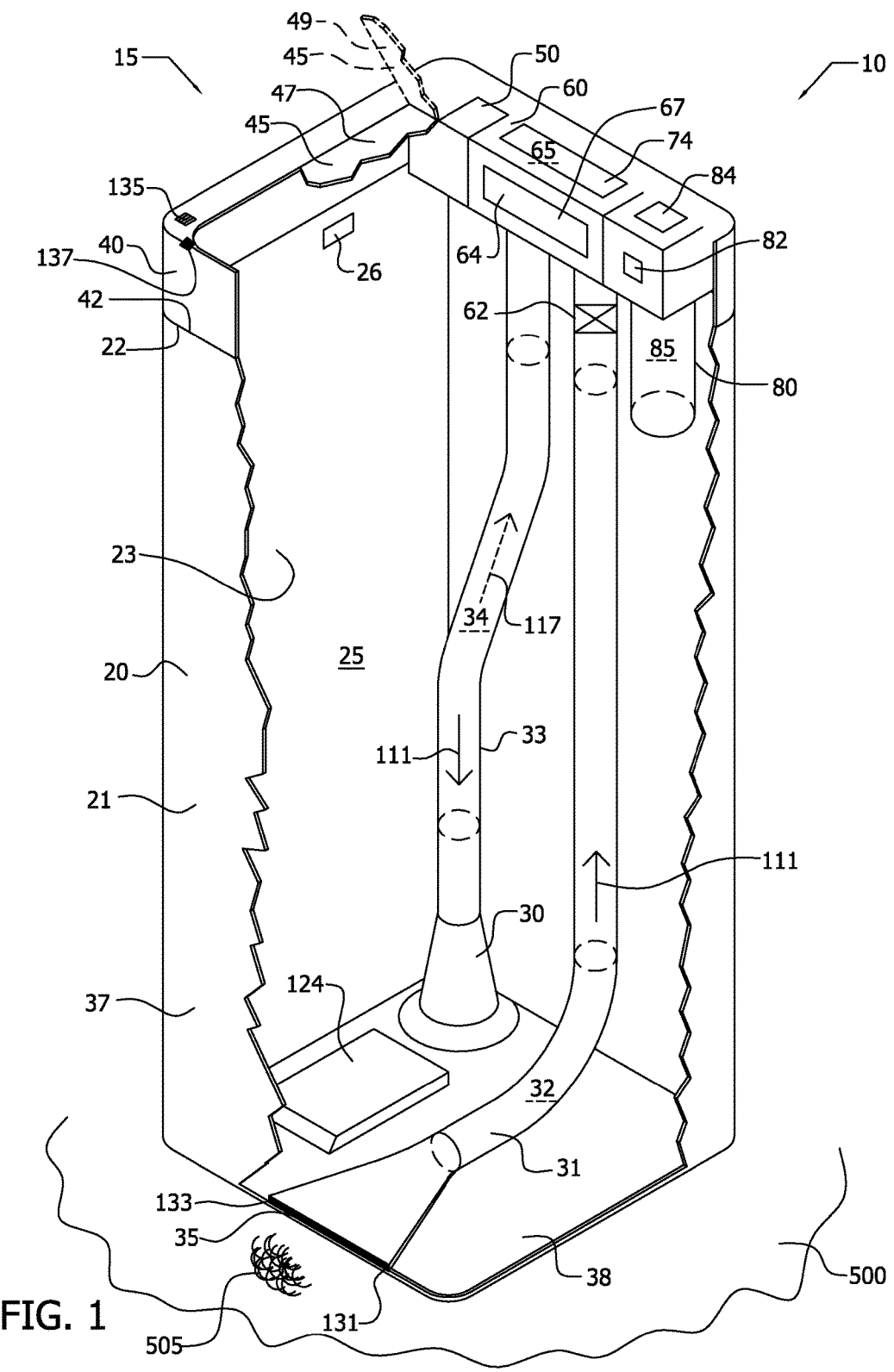
FIG. 1 illustrates by cut-away perspective view and exemplary implementation of a trashcan system.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

The present application claims priority to and benefit of U.S. Provisional Patent Application No. 62/048,993 filed on Sep. 11, 2014, the disclosure of which is hereby incorporated by reference in its entirety herein.

A trashcan system is disclosed herein. In various aspects, the trashcan system includes a trashcan with an inlet located proximate to a surface upon which the trashcan is placed. A collector that forms a chamber is disposed within the trashcan, in various implementations, and airflow with materials entrained therein is communicated from around the surface into the inlet and thence into the chamber for collection of the entrained materials in the chamber. The airflow may then be communicated from the chamber through a filter and exhausted through an exit.

The communication of airflow or stoppage of the communication of airflow from the inlet to the chamber may be controlled, at least in part, by emission of a signal indicative of a condition by a sensor. The condition may be, for example, placement of an object, such as a broom, proximate the inlet, or the motioning of an object, such as a broom, proximate the inlet.

A sensor may be placed about the trashcan that, upon detection of a condition, emits a signal that causes a lid to move from a closed position into an open position so that the user may deposit material into a trash bag within a chamber of the trashcan.

Other sensor(s) may be placed about the trashcan that emits signal(s) indicative of various conditions, and the status of the trashcan may comprise the condition(s) indicated by the sensor(s). A controller disposed about the trashcan may determine the status of the trashcan using the signal(s) indicative of the various conditions, and the controller may communicate wirelessly the status to a software application ("App") operatively received by a handheld electronic device, such as a mobile phone. The status may be indicative of a quantity of trash bags contained within a container portion of the trashcan, a battery charge of a battery portion of a power supply, or the availability of electrical power. The App may communicate with a vendor to allow the user to order trash bags from the vendor when the quantity of trash bags contained within a container portion of the trashcan falls below some minimum number of trash bags. The App may allow the user to order other supplies or parts related to the trashcan system.

FIG. 1 illustrates an exemplary implementation of trashcan system 10 including trashcan 15. Trashcan 15, in this implementation, includes body 20 and assembly 40. Body 20, as illustrated, includes side portion 37 and base 38. Base 38 may rest upon surface 500, as illustrated, with side portion 37 extending vertically from base 38. Side portion 37 and base 38 may be formed of unitary construction by being molded together to form body 20, in some implementations. In other implementation, for example, base 38 may be bonded adhesively or solvent welded to side portion 37 to form body 20. Body 20 defines outer surface 21 and inner surface 23 with inner surface defining chamber 25, as illustrated in FIG. 1. Base 38 is generally rectangular, in this implementation, so that chamber 25 is generally rectangular. In other implementations, base 38 and side portion 37 may be shaped so that chamber 25 of body 20 has some other geometric shape such as cylindrical, hexagonal, or square. Surface 500 upon which base 38 of body 20 rests may be, for example, a floor, counter top, or tabletop.

In the implementation of FIG. 1, assembly 40 is removably secured to body 20 with end 22 of body 20 engaged circumferentially with end 42 of assembly 40. End 22 or end 42 may be slotted, ridged, or otherwise configured to engage one another, in various implementations. When end 42 of assembly 40 is engaged with end 22 of body 20, chamber 25 is substantially enclosed, in this implementation. Assembly 40 is shaped to conform to the shape of body 20 at end 22, and assembly 40 may be round, hexagonal, or otherwise shaped in conformance to the shape of end 22 of body 20, in various implementations. Body 20 and assembly 40 may be formed, for example, of plastic, metal such as steel or aluminum, or combinations thereof.

A trash bag 105 (see FIG. 6) may be disposed within chamber 25 in an open position to receive trash therein, and the trash bag 105 may be releasably engaged proximate end 22 of body 20 by attachments 26 provided about inner surface 23 proximate end 22 for the purpose of engaging trash bag 105. Attachments 26 may be, for example, clips that releasably engage the trash bag 105 to hold the trash bag 105 in the open position within chamber 25 for the reception of trash. Assembly 40 may be removed from body 20 to allow trash bag 105 to be disposed within chamber 25 or removed from chamber 25, and then assembly 40 may be secured to body 20 with trash bag 105 secured in chamber 25. The circumferential engagement of end 42 with end 22 may allow assembly 40 to sealingly enclose chamber 25, which may prevent the escape of odors or materials from chamber 108 of trash bag 105 when trash bag 105 is disposed within chamber 25.

Assembly 40, as illustrated, includes lid 45 positionable between a closed position 47 that encloses chamber 25 and an open position 49 (illustrated in phantom) that reveals chamber 25 thereby allowing a user to deposit trash within chamber 108 of trash bag 105 disposed within chamber 25. Note that, for clarity of explanation, only a portion of lid 45 is illustrated in FIG. 1.

As illustrated in FIG. 1, trashcan 15 of trashcan system 10 includes vacuum assembly 30. Vacuum assembly 30, in this implementation, includes an impeller case containing within an impeller driven by an electric motor. Vacuum assembly 30 may include screen(s), filter(s), gears, bearings, electrical pathways, air passageways, capacitors and other electrical components, and other features and components, as would be readily recognized by those of ordinary skill in the art upon study of this disclosure. In various implementations, vacuum assembly 30 may be reversible to alter the direction of airflow through vacuum assembly 30.

Vacuum assembly 30, as illustrated in FIG. 1, is in air communication with tube 33, collector 60, and tube 31 in sequence. Accordingly, vacuum assembly 30 may draw air successively from proximate surface 500 through inlet 35 into passageway 32 of tube 31, through chamber 65 of collector 60, through passageway 34 of tube 33, through vacuum assembly 30, and, thence, discharged through exit 29 (see FIG. 3). Although illustrated as circular in cross-section, tubes 31, 33 may have a rectangular, oval, square, or other cross-sectional geometry, or combinations of cross-sectional geometries, in other implementations. Tubes 31, 33 may, for example, be made of metal, plastic, rubber, or combinations of metal, plastic, and rubber. Tubes 31, 33 may, for example, be formed, at least in part, as a molded portion of base 38 or side portion 37. Tubes 31, 33 may be disposed in various ways about trashcan 15 to connect with inlet 35, collector 60, and vacuum assembly 30. For example, although illustrated as located within chamber 25, tubes 31, 33 may be located, at least in part, external to outer surface 21.

Note that, in the exemplary implementation of FIG. 1, vacuum assembly 30 is mounted to base 38 portion of body 20, and exit 29 is configured in base 38. In other implementations, vacuum assembly 30 may be mounted variously about body 20 or assembly 40, and exit 29 may be located variously about body 20 or assembly 40, and air passageway(s) may be provided to communicate air between vacuum assembly 30 and exit 29. Inlet 35, as illustrated, is located in side portion 37 of body 20 proximate base 38 to allow materials upon surface 500 to be entrained within the air drawn into inlet 35. Inlet 35, as illustrated, is shaped to accelerate the air drawn into inlet 35. Materials 505 may include, for example, dirt, dust, sweepings, or debris. Inlet may be otherwise located about body 20 including side portion 37 and base 38, in various implementations.

Collector 60, in this implementation, defines chamber 65 within which materials 505 are deposited from airflow 111 as airflow 111 passes from inlet 35 through tube 31, collector 60, and tube 33 in succession (airflow 111 is illustrated in FIG. 1 by a solid arrow in tubes 31, 33). Valve 62 allows passage of airflow 111 through tube 31, and door 64 of collector 60 is in a closed position 67 during airflow 111, as illustrated.

As illustrated in FIG. 1, trashcan 15 includes power supply 50 that may be connectable to mains electric. Power supply 50 may include a battery, transformer, power cord, and other components, as would be readily recognized by those of ordinary skill in the art upon study of this disclosure. Power may flow from power supply 50 to various electrical components disposed about trashcan 15 including controller 124, vacuum assembly 30, electro-mechanical portions of lid 45, sensors 82, 131, 133 135, 137, and display 140 (see FIG. 5).

Controller 124, in this implementation, is in operable communication with vacuum assembly 30, power supply 50, sensors 82, 131, 133, 135, 137 and display 140 to control the operations of vacuum assembly 30, power supply 50, sensors 82, 131, 133, 135, 137 and display 140 or to receive input from display 140 directive of the operation of vacuum assembly 30, power supply 50, sensors 82, 131, 133, 135, 137 or display 140. Sensors 82, 131, 133, 135, 137 communicate signals 92, 141, 143, 145, 147, respectively, to controller 124, and signals 92, 141, 143, 145, 147 may be indicative of conditions detected by corresponding sensors 82, 131, 133, 135, 137. Controller 124 may include a microprocessor, memory, A/D converter, D/A converter, wireless communication hardware, and software may be operably received by controller 124 to control the operations of controller 124, and, thus, vacuum assembly 30, power supply 50, sensors 82, 131, 133, 135, 137 and display 140.

As illustrated in FIG. 1, trashcan 15 includes container 80 for the storage of trash bags, such as trash bag 105. Container 80 defines chamber 85 within which trash bags, for example, in the form of a roll or boxed may be stored. Container 80 is illustrated as cylindrical in shape, but container 80 may have some other shape and container 80 may have other placements about trashcan 15, in various other implementations.

Sensor 82, which is disposed about container 80 as illustrated in FIG. 1, communicates operably with container 80 to detect the presence of trash bags within chamber 85 of container 80. Sensor 82 may detect the weight of container 80 including trash bags within chamber 85 to determine the quantity of trash bags within chamber 85 as a function of the weight of container 80. In some implementations, sensor 82 may be an optical sensor that optically detects the presence or quantity of trash bags within chamber 85. The user may access chamber 85 including trash bag(s) stored therein via door 84 to empty chamber 85 or to replenish chamber 85 with additional trash bag(s). The user may withdraw a trash bag 105 from chamber 85 via door 84, and then dispose the trash bag 105 within chamber 25 in an open position to receive trash therein.

Figure 2A:
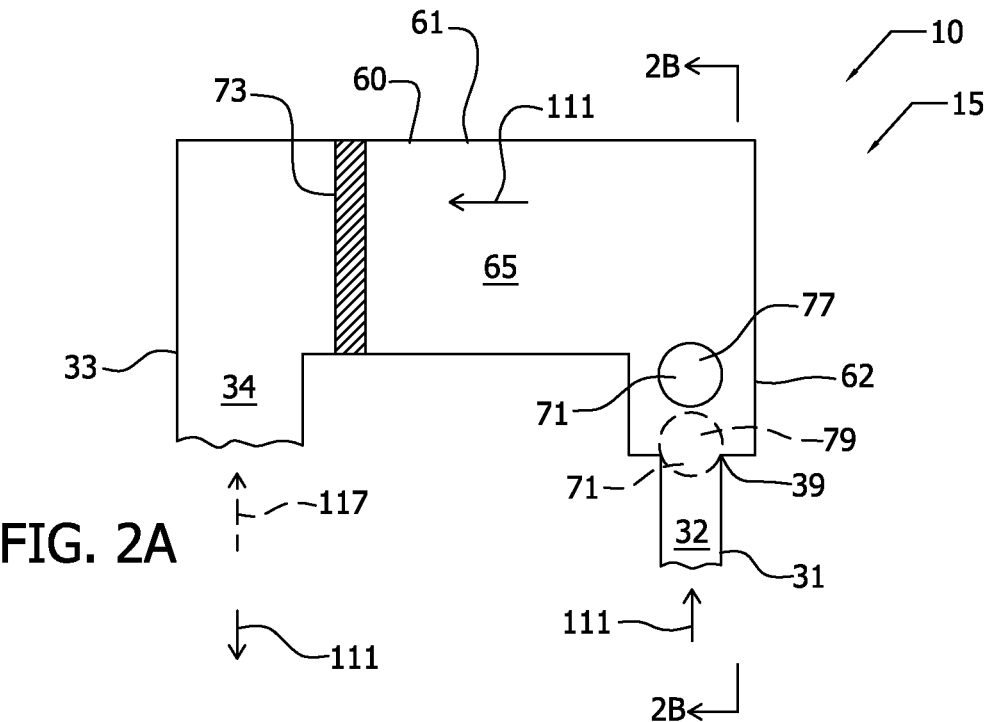
FIG. 2A illustrates by cut-away side view portions of the exemplary implementation of the trashcan system of FIG. 1.

In implementations in which collector 60 is attached to assembly 40, collector 60, tubes 31, 33, or collector 60 and tubes 31, 33 may be configured to allow for detachment from and reattachment to portions secured to base 38 in order to allow assembly 40 to be removed from body 20 and assembly 40 to be reattached to body 20. Power supply 50 and container 80 may be secured to either assembly 40, base 38, or both assembly 40 and base 38 in ways that allow assembly 40 to be removed from base 38 and assembly 40 to be reattached to base 38. Power supply 50, collector 60, and container 80 may be variously disposed about trashcan 15 including external to outer surface 21, at least in part, in various implementations. Power supply 50, collector 60, or container 80 may be disposed about body 20, assembly 40, or both body 20 and assembly 40, in various implementations FIG. 2A illustrates portions of trashcan 15 including collector 60. As illustrated in FIG. 2A, collector 60 includes collector housing 61 that defines chamber 65 within which portions of material 505 as may be entrained in airflow 111 is deposited. While collector housing 61 is illustrated as rectangular, collector housing 61 may assume other geometric shapes in other implementations. As illustrated in FIG. 2A, airflow 111 propelled by vacuum assembly 30 passes from passageway 32 of tube 31 through valve 62 into chamber 65 of collector 60. In this implementation of valve 62, airflow 111 levitates sphere 71 of valve 62 into open position 77 away from mouth 39 of tube 31 allowing airflow 111 to pass from passageway 32 of tube 31 into chamber 65. Chamber 65 may slow airflow 111 due to the expanded cross-sectional area of chamber 65 thereby allowing material 505 to settle out of airflow 111 into chamber 65.

Chamber 65 is bounded, in part, by filter 73 that allows the passage of airflow through filter 73 while filtering out particles of material 505 from airflow 111 as airflow 111 passes from chamber 65 into passageway 34 of tube 33, as illustrated in FIG. 2A. Filter 73 accordingly functions to retain material 505 within chamber 65, in this implementation. Airflow 111, as illustrated in FIG. 2A, passes from chamber 65 through filter 73, thence through passageway 34 of tube 33 for discharge through exit 29. In this implementation, the user may access filter 73 in order to clean or change filter 73 via door 74, and the user may otherwise clean or service chamber 65 via door 74. Other accesses for cleaning or changing filter 73 may be provided, in other implementations.

As illustrated in FIG. 2A, vacuum assembly 30 may reverse the airflow to draw air in from exit 29 as airflow 117, which is illustrated in phantom. Airflow 117 may flow from passageway 34 of tube 33 through filter 73 into chamber 65. Sphere 71 in closed position 79, as illustrated in phantom, blocks airflow 117 from entering passageway 32 of tube 31 by blocking mouth 39 of tube 31, in this implementation of valve 62. Sphere 71 may be held in closed position 79, at least in part, by gravity, and sphere 71 may be held in closed position 79, at least in part, by airflow 117.

Figure 2B:
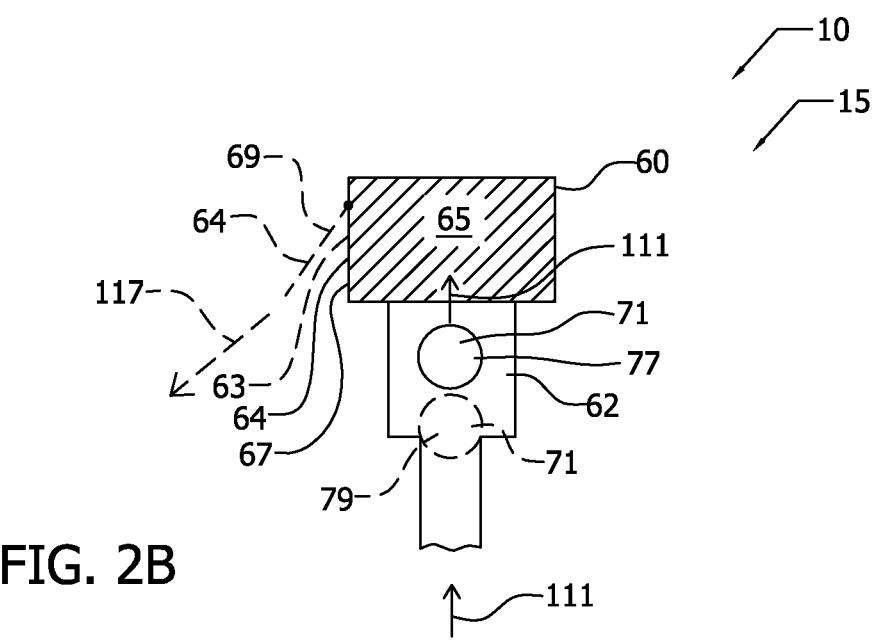
FIG. 2B illustrates by cut-away end view portions of the exemplary implementation of the trashcan system of FIG. 1.

As illustrated in FIG. 2B, with airflow 111 passing through chamber 65 of collector 60, door 64 in maintained in closed position 67 (illustrated in solid line). Suction pressures of airflow 111 in combination with gravity may maintain door 64 in closed position 67.

As illustrated in FIG. 2B, airflow 117 passing into chamber 65 may create pressure within chamber 65 forcing door 64 from closed position 67 into open position 69 (illustrated in phantom). With valve 62 in closed position 79, airflow 117 may then force material 505 from filter 73 and from chamber 65 through aperture 63 into chamber 108 of trash bag 105 that is mounted within chamber 25 of trashcan 15.

Doors 64, 74, 84 are located as illustrated in the Figures for explanatory purposes. It should be recognized that doors 64, 74 may be otherwise located about collector housing 61, or that door 84 may be located about container 80, in other implementations.

Note that sphere 71 is illustrated as a sphere, in other implementations sphere 71 may assume other geometric shapes. While a particular implementation of valve 62 is illustrated in the Figures, it should be understood that valve 62 may be configured as a flap valve, check valve, electromechanically actuated valve, or other one way valve, in various other implementations.

Figure 3:
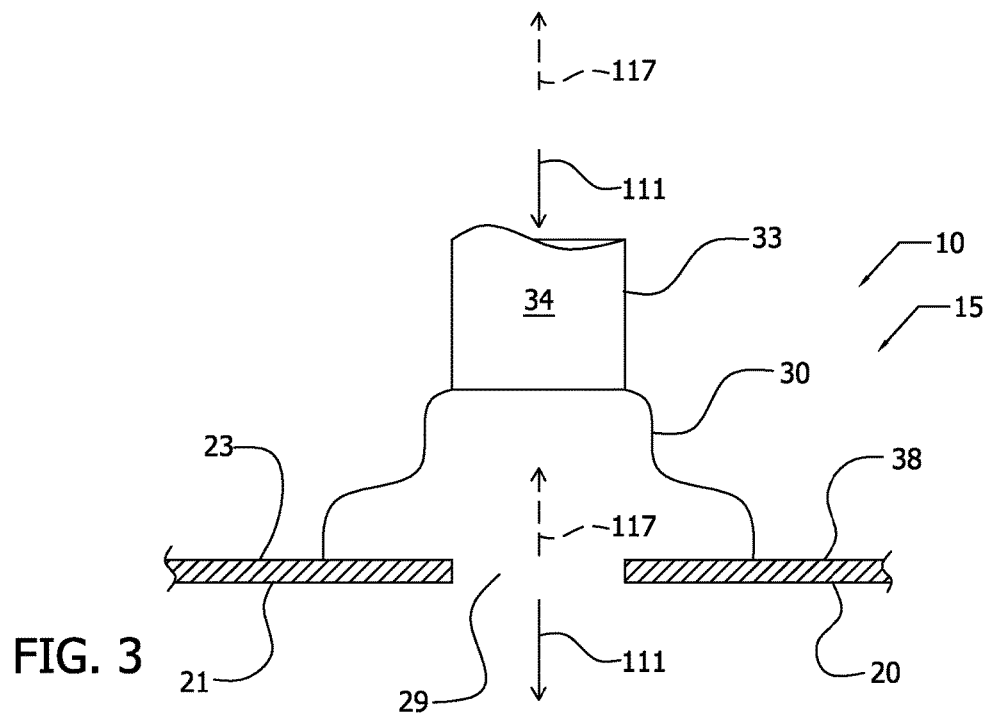
FIG. 3 illustrates by cut-away view portions of the exemplary implementation of the trashcan system of FIG. 1.

FIG. 3 illustrates portions of exemplary trashcan 15 proximate vacuum assembly 30. As illustrated in FIG. 3, vacuum assembly 30 is mounted about inner surface 23 of base 38 portion of body 20. As propelled by vacuum assembly 30, either airflow 111 is discharged from passageway 34 of tube 33 through exit 29, or airflow 117 is drawn through exit 29 into passageway 34 of tube 33. Base 38 may be formed geometrically with channels, feet, or otherwise configured to allow air to communicate with exit 29. Exit 29 may be disposed about side portion 37 of body 20, in other implementations.

Figures 5, 6:
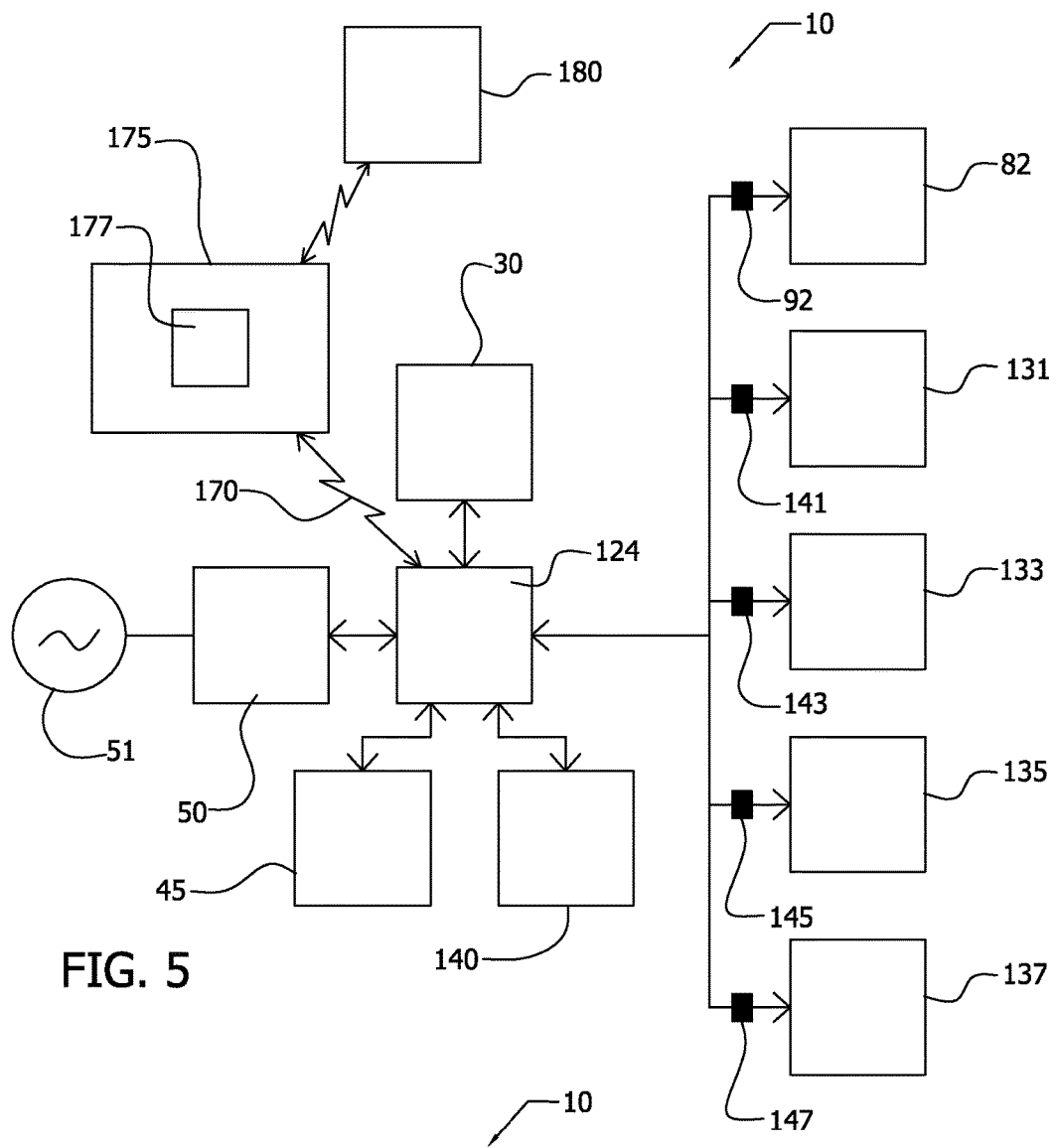
FIG. 5 illustrates by schematic diagram portions of the exemplary implementation of the trashcan system of FIG. 1; and, FIG. 6 illustrates by perspective view an exemplary trash bag as may be employed, for example, in conjunction with either the exemplary implementation of the trashcan system of FIG. 1 or the exemplary implementation of the trashcan system of FIG. 4.

FIG. 5 illustrates schematically exemplary trashcan system 10 including trashcan 15 and App 177 operatively received by phone 175. As illustrated in FIG. 5, power supply 50 electrically communicates with source 51 to receive power from source 51, and power supply 50 communicates with, for example, vacuum assembly 30, display 140, lid 45, controller 124, and sensors 82, 131, 133, 135, 137, to flow power to vacuum assembly 30, display 140, lid 45, controller 124, and sensors 82, 131, 133, 135, 137. Source 51 may be mains electric.

Controller 124, as illustrated in FIG. 5, communicates with phone 175 via wireless communications channel 170. Wireless communication channel 170 may be, for example, Bluetooth, Wi-Fi (e.g. IEEE 802.11), cellular (e.g. CDMA), and controller 124 includes hardware and associated operable software to effectuate communication with phone 175 via wireless communication channel 170.

Phone 175 includes any digital processor enabled device including, for example, phones, tablets, computers, or appliances. App 177 may be in the form of software operably received by phone 175. For example, the user may download App 177 to phone 175 upon purchasing trashcan system 10. After installing operatively App 177 onto phone 175, phone 175 may be paired with trashcan 15 to establish communication channel 170 between controller 124 of trashcan 15 and phone 175.

App 177 may perform various functions. For example, App 177 may allow the user to register a warranty from trashcan system 10. Also, the user may use the App 177 to purchase replacement trash bags, such as trash bag 105, filter 73, parts, and other accessories for the trashcan system 10. App 177 may communicate with vendor 180 for example, via Internet, and vendor 180 may vend said trash bags, filter 73, parts, and other accessories to the user. App 177 may allow the user to set alerts for particular dates and times, for example, to remind the user to take out the trash.

Controller 124, as illustrated in FIG. 5, communicates operatively with vacuum assembly 30, lid 45, display 140, and sensors 82, 131, 133, 135, 137 to receive signals 92, 141, 143, 145, 147 from sensors 82, 131, 133, 135, 137, respectively. Signals 92, 141, 143, 145, 147 may be indicative of conditions detected by sensors 82, 131, 133, 135, 137. Controller 124, in this implementation, communicates with vacuum assembly 30 and with sensors 133, 135 in order to direct vacuum assembly 30 to produce airflow 111, airflow 117, or no airflow.

Sensors 133, 135 may be configured as photocells. Sensor 133 is located proximate inlet 35, and sensor 135 is located elsewhere about trashcan 15, as illustrated in FIG. 1. A broom used to sweep material 505 proximate inlet 35, for example, may partially obscure light from reaching sensor 133 while sensor 135 concurrently detects light. Thus, the difference in light at sensors 133, 135 as indicated by the difference between signal 143 and signal 145 may be indicative of the presence of an object, such as the broom, proximate inlet 35. Controller 124 may respond to the difference between signal 143 and signal 145 by causing vacuum assembly 30 to rotate to produce airflow 111 for a predetermined time. Thus, in this example, differences in light indicative of the presence of the broom is the condition indicated by signals 143, 145 from sensors 133, 135. Following the predetermined time, the controller 124 may direct vacuum assembly 30 to rotate in order to produce airflow 117 for a second predetermined time that discharges material 505 from chamber 65 into trash bag 105. The triggering of airflow 111 into inlet 35 by controller 124 based upon differences between signals 143, 145 may be adjusted to compensate for differences in light striking sensors 133, 135 not caused by the broom proximate inlet 35.

Sensor 131 may be configured as a motion sensor that detects motion. The predetermined time that airflow 111 is produced may be extended based upon signal 141 from sensor 131, with signal 141 being indicative of the motion of an object, such as a broom, proximate inlet 35. The motion of the object is the condition indicated by signal 141, in this implementation. Airflow 111 may be maintained as long as there is motion, such as sweeping, proximate the inlet 35, and airflow 111 may be maintained for some time after the cessation of motion. The predetermined time may thus include an initial set time period that is extended as long as motion persists proximate the inlet 35 and then extended further by a second set time following cessation of motion proximate the inlet 35.

Lid 45, in implementation of trashcan system 10, includes an electromechanical actuating device such as a servo motor, and controller 124 communicates with the electromechanical actuating device portion of lid 45 to position lid between closed position 47 and open position 49. In order to position lid between closed position 47 and open position 49, the user may, for example, motion a hand toward sensor 137 of trashcan 15. Sensor 137 may be a motion sensor, and sensor 137 may be located about body 20 or assembly 40 generally proximate lid 45, as illustrated in FIG. 1. Thus, signal 147 may be indicative of the presence of motion, such as movement of the user's hand, which is the condition indicated by signal 147, in this implementation. Upon sensing motion of the user's hand using sensor 137, controller 124 may communicate with lid 45 to position lid 45 from the closed position 47 into the open position 49. When lid 45 is in open position 49 and hand motion is no longer sensed using sensor 137, controller 124 may position lid 45 from open position 49 to closed position 47.

In some implementations, sensor 137 in cooperation with controller 124 may be configured to differentiate between the user's hand and either some other heat emitting object such as an animal or an object at ambient temperature through the use of infrared sensing. In such implementations, when controller 124 in cooperation with sensor 137 determines that the sensed object is not a user's hand, lid 45 will not be positioned from closed position 47 to open position 49.

As illustrated in FIG. 5, controller 124 communicates with sensor 82 to detect trash bags, such as trash bag 105, within chamber 85 of container 80. Signal 92 is emitted by sensor 82, and signal 92 is indicative of the quantity of trash bags 105 within chamber 85. The condition indicated by signal 92 is, thus, the quantity of trash bags 105 within chamber 85. Signal 92 may be an optical signal indicative of the quantity of trash bags 105. Signal 92 may be indicative of the weight of container 80 including trash bags 105 within chamber 85, the weight of container 80 indicated by signal 92 decreasing as the quantity of trash bags 105 within chamber 85 decreases. When controller 124 using signal 92 from sensor 82 determines that chamber 85 is empty or that the quantity of trash bags within chamber 85 is less than some minimum quantity, controller 124 may send wireless signal 170 to App 177 operatively received on phone 175. The user may then be alerted via App 177 on phone 175 that additional trash bags are needed, and App 177 may connect to vendor 180 to allow the user to purchase trash bags from vendor 180.

Display 140, as illustrated in FIG. 5, is provided about trashcan 15 to allow the user to monitor the status of trashcan 15 or to alter the operation of trashcan 15. Display 140 communicates with controller 124, as illustrated, to allow controller 124 to display indications of the status of trashcan 15 to the user using display 140. The status may be indicative of a quantity of trash bags contained within a container portion of the trashcan, a battery charge of a battery portion of a power supply, or the availability of electrical power. The user may communicate instructions to controller 124 that control the operation of trashcan 15 using display 140.

FIG. 6 illustrates an exemplary trash bag 105. As illustrated in FIG. 6, trash bag 105 defines chamber 108 for the deposition of trash therein, and trash bag 105 includes drawstrings 109 that allow the user to enclose chamber 108 including trash received therein. Trash bag 105 may be included in a roll or boxed with a number of similar bags. Trash bag 105 is exemplary as illustrated, and trash bag as used herein includes any commercially available trash bag or aggregation of trash bags.

Figure 4:
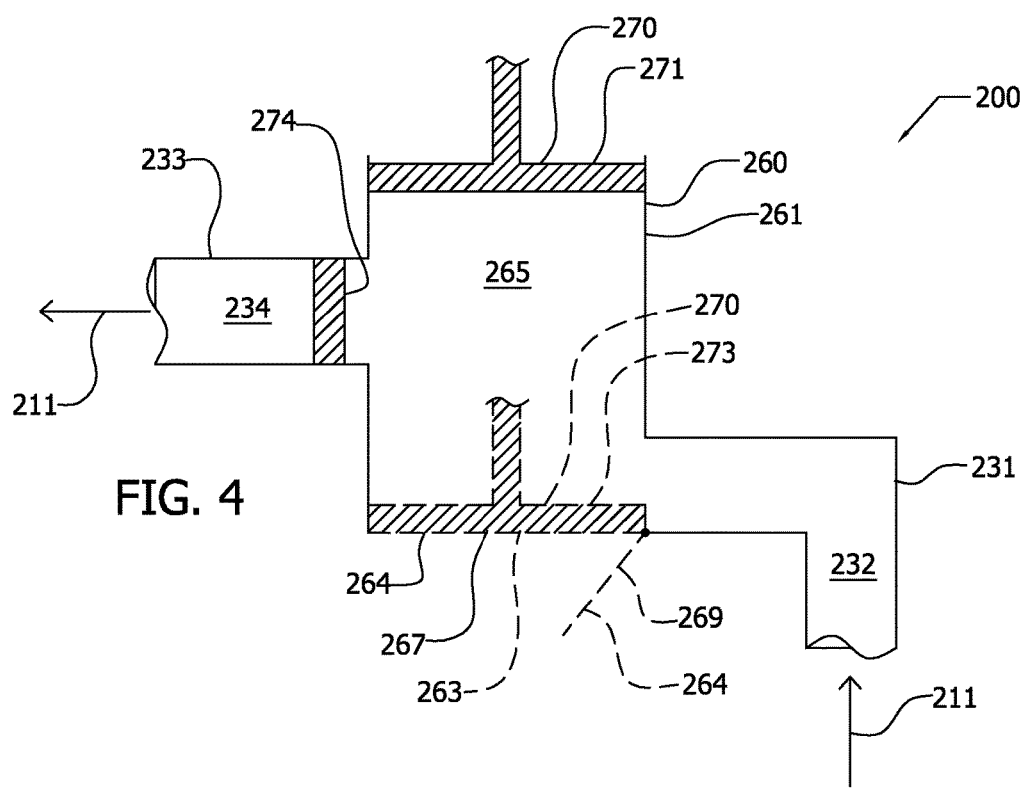
FIG. 4 illustrates by cut-away side view portions of another exemplary implementation of a trashcan system.

Portions of another implementation of a trashcan system 200 are illustrated in FIG. 4. As illustrated in FIG. 4, collector 260 includes collector housing 261 that defines chamber 265. Airflow 211 is communicated to chamber 265 via passageway 232 of tube 231, and airflow 211 is communicated from chamber 265 via passageway 234 of tube 233, as illustrated. Material, such as material 505, may be deposited within chamber 265 by airflow 211. Filter 274 filters material from airflow 211 as airflow 211 exits chamber 265 into passageway 234 of tube 233 to retain the material within filter 274 or within chamber 265, in this implementation. When airflow 211 is ceased, door 264 may be positioned from closed position 267 to open position 269, and then plunger 270 may be advanced from position 271 to position 273 to expel material from chamber 265 through aperture 263 into a trash bag, such as trash bag 105, positioned within a chamber, such as chamber 25. Plunger 270 includes plunger, brushes, scrapers, or other such devices that may be used to expel the material 505 forth from chamber 265. Door 264 or plunger 270 may be automatically positioned under the control of a controller, such as controller 124, and various electromechanical mechanisms may be included in trashcan 200 to effectuate the positioning of door 264 between closed position 267 and open position 269 or to effectuate the positioning of plunger 270 between positions 271, 273, in some implementations. In other implementations, the user may position the door 264 between closed position 267 and open position 269 or position plunger 270 between positions 271, 273.

In operation, a vacuum assembly, such as vacuum assembly 30, of a trashcan system, such as trashcan system 10, 200 may be activated to produce airflow, such as airflow 111, to draw material, such as material 505, into an inlet, such as inlet 35. One or more sensor(s), such as sensor 133, 135, in cooperation with a controller, such as controller 124, may activate the vacuum assembly to produce the airflow. The sensor(s) may emits signal(s), such as signals 143, 145, indicative of a condition such as the presence of an object (e.g. a broom), proximate the inlet. The airflow may draw the materials from the inlet through one or more tubes, such as tube 31, into a chamber of a collector housing, such as chamber 65 of collector housing 61. The airflow may occur for a predetermined time. A sensor, such as sensor 131, may emit a signal, such as signal 141, indicative of motion proximate the inlet, such as motion of a broom, and the airflow may be maintained for at least as long as the motion persists. That is, the predetermined time may be increased by the sensing of motion proximate the inlet.

After the predetermined time, the vacuum assembly may reverse rotation to produce a reverse airflow, such as airflow 117, that forces material from the chamber into a trash bag, such as trash bag 105, received within a chamber, such as chamber 25, of the trashcan, such as trashcan 15, in some implementations. The reverse airflow may occur for a second predetermined time. In other implementations, a plunger, such as plunger 270, may be positioned, for example between positions 271, 273, to force material out of the chamber into the trash bag, and positioning of plunger between the positions may be effectuated electro-mechanically as controlled by the controller.

A lid, such as lid 45, may be positioned between a closed position and an open position, such as closed position 47 and open position 49, upon emission of a signal, such as signal 147, indicative of a condition, such as the motion of a user's hand, by a sensor, such as sensor 137.

A sensor, such as sensor 82, may emit a signal, such as signal 92, indicative of the quantity of trash bags within a chamber of a container mounted about the trashcan, such as chamber 85 of container 80. When the signal indicative of the quantity of trash bags indicates that the quantity of trash bags within the chamber is less than some minimum quantity, a wireless signal, such as wireless signal 170, may be sent by the controller to an App operatively received by a phone, such as App 177 operatively received by phone 175. The user may then be alerted via the App on the phone that additional trash bags are needed, and the App may connect to a vendor, such as vendor 180, to allow the user to purchase trash bags from the vendor.

A display, such as display 140 may be provided about the trashcan to allow the user to monitor the status of the trashcan or trashcan system or to alter the operation of the trashcan or the trashcan system. The display may display information indicative of the status of the trashcan or of the trashcan system to the user. Using the display, the user may communicate instructions to the trashcan system including the trashcan to control the operation thereof. For example, the user may switch power to the trashcan from a source, such as source 51, or power from the power supply to components in electrical communication with the power supply, between an ON state and an OFF state using the display. The user may control airflow including airflow into the inlet using the display.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A trashcan system, comprising:
   an inlet located about a trashcan to be proximate to a surface upon which the trashcan is placed in order to entrain materials disposed upon the surface into air communicated into the inlet;
   a collector disposed within the trashcan, a chamber of the collector receives air with materials entrained therein communicated from the inlet, the chamber adapted to collect materials entrained in the air;

an exit located about the trashcan, the exit communicating with the chamber to exhaust the air from the chamber;

a filter interposed between the chamber and the exit to remove materials from the air passing between the chamber and the exit; and a vacuum assembly located about the trashcan, the vacuum assembly in cooperation with the inlet, the chamber, and the exit to communicate the air into the inlet, through the chamber, to the exit, the air being exhausted from the exit, wherein the vacuum assembly is operable to reverse air flow and thereby communicate the air into the exit and into the chamber.

2. The trashcan system of claim 1, further comprising a sensor that emits a signal indicative of a condition, the sensor in operative communication with the vacuum assembly to cause the vacuum assembly to communicate the air into the inlet upon emission of the signal.

3. The trashcan system of claim 1, further comprising a door positioned about the collector, the door positionable between a closed position and an open position, the door in the open position reveals an aperture, material may be ejected from the chamber through the aperture.

4. The trashcan system of claim 1, further comprising a valve that blocks air flow from the chamber to the inlet when air is communicated from the exit into the chamber by reversal of the vacuum assembly.

5. The trashcan system of claim 4, wherein the air communicated from the exit into the chamber expels materials from the chamber into a trash bag located within the trashcan.

6. A trashcan system, comprising:

an inlet located about a trashcan to be proximate to a surface upon which the trashcan is placed in order to entrain materials disposed upon the surface into air communicated into the inlet;

a collector disposed within the trashcan, a chamber of the collector receives air with materials entrained therein communicated from the inlet, the chamber adapted to collect materials entrained in the air;

an exit located about the trashcan, the exit communicating with the chamber to exhaust the air from the chamber;

a filter interposed between the chamber and the exit to remove materials from the air passing between the chamber and the exit; and a vacuum assembly located about the trashcan, the vacuum assembly in cooperation with the inlet, the chamber, and the exit to communicate the air into the inlet, through the chamber, to the exit, the air being exhausted from the exit, wherein the collector having a plunger operable to expel materials from the chamber into a trash bag located within the trashcan.

7. The trashcan system of claim 1, the trashcan further comprising:

a lid positionable between a closed position and an open position; and a sensor in operative communication with the lid to cause the lid to move from the closed position to the open position upon detection of a signal.

8. A trashcan system, comprising:

an inlet located about a trashcan to be proximate to a surface upon which the trashcan is placed in order to entrain materials disposed upon the surface into air communicated into the inlet;

a collector disposed within the trashcan, a chamber of the collector receives air with materials entrained therein communicated from the inlet, the chamber adapted to collect materials entrained in the air;

an exit located about the trashcan, the exit communicating with the chamber to exhaust the air from the chamber;

a filter interposed between the chamber and the exit to remove materials from the air passing between the chamber and the exit;

a vacuum assembly located about the trashcan, the vacuum assembly in cooperation with the inlet, the chamber, and the exit to communicate the air into the inlet, through the chamber, to the exit, the air being exhausted from the exit;

an App operatively received by a handheld electronic device to display a status of the trashcan to a user;

one or more sensors disposed about the trashcan to detect a signal indicative of a status of the trashcan; and a controller disposed about the trashcan, the controller in communication with the one or more sensors to determine the status of the trashcan using the signal, the controller in wireless communication with the App to communicate wirelessly the status to the App, wherein the status comprises a quantity of trash bags within a container portion of the trashcan.

9. The trashcan system of claim 8, further comprising a vendor in communication with the App to provide trash bags to the user when prompted by a request communicated to the vendor by the App.

10. The trashcan system of claim 1, wherein the trashcan includes a base a sidewall.

11. The trashcan system of claim 1, wherein the trashcan is rectangular.

12. The trashcan system of claim 1, wherein the trashcan includes a power supply.

13. The trashcan system of claim 1, wherein the power supply includes an electric motor.

14. The trashcan system of claim 1, wherein the vacuum assembly communicates the air via one or more tubes.

15. The trashcan system of claim 5, wherein the trash bag is held in place via clips to hold the trash bag in an open position within the chamber for the reception of trash.

16. The trashcan system of claim 8, wherein the one or more sensors detect the presence or quantity of trash bags within the chamber.

* * * * *